United States Patent [19]

Yatsunami et al.

[11] Patent Number: 5,434,212
[45] Date of Patent: Jul. 18, 1995

[54] TIRES HAVING AN INNER LINER COMPRISING A RUBBER COMPOSITION AND A COUMARONE RESIN

[75] Inventors: Joji Yatsunami, Tokyo; Takuo Yasuda, Saitama, both of Japan

[73] Assignee: Bridgestone Corporation, Tokyo, Japan

[21] Appl. No.: 337,015

[22] Filed: Nov. 7, 1994

Related U.S. Application Data

[60] Continuation of Ser. No. 119,560, Sep. 13, 1993, abandoned, which is a division of Ser. No. 892,995, Jun. 3, 1992, abandoned.

[30] Foreign Application Priority Data

Jun. 6, 1991 [JP] Japan ................... 3-160897

[51] Int. Cl.$^6$ .................... C08K 3/04; C08L 47/00; B60C 5/12
[52] U.S. Cl. .................... 524/495; 524/496; 524/270; 524/273; 525/235; 525/236; 525/237; 152/510
[58] Field of Search ............. 524/270, 273, 495, 496; 525/235, 236, 237; 152/510

[56] References Cited

U.S. PATENT DOCUMENTS

| | | | |
|---|---|---|---|
| 4,477,621 | 10/1984 | Sato et al. | 524/495 |
| 4,587,302 | 5/1986 | Berta | 525/237 |
| 4,725,649 | 2/1988 | Hoshino | 525/236 |
| 4,754,793 | 7/1988 | Mohammed | 152/510 |
| 5,128,395 | 7/1992 | Terakawa et al. | 524/270 |
| 5,137,981 | 8/1992 | Yamada et al. | 525/332.3 |

FOREIGN PATENT DOCUMENTS

| | | |
|---|---|---|
| 57-172945 | 10/1982 | Japan . |
| 57-195760 | 12/1982 | Japan . |
| 62-1735 | 1/1987 | Japan . |
| 62-62848 | 3/1987 | Japan . |
| 62-62849 | 3/1987 | Japan . |
| 1215838 | 8/1989 | Japan . |

*Primary Examiner*—Tae H. Yoon
*Attorney, Agent, or Firm*—Sughrue, Mion, Zinn, Macpeak & Seas

[57] ABSTRACT

A rubber composition for an inner liner comprises a coumarone resin and a member selected from the group consisting of natural rubber, synthetic rubber, a blend of natural rubber and synthetic rubber, and a blend of synthetic rubbers. The rubber composition for inner liner exhibits good shrinkage resistance and good inner pressure retaining property without deteriorating a running durability of a tire where the rubber composition is used as an inner liner.

4 Claims, No Drawings

TIRES HAVING AN INNER LINER COMPRISING A RUBBER COMPOSITION AND A COUMARONE RESIN

This is a Continuation of application Ser. No. 08/119,560 filed Sep. 13, 1993, now abandoned, which is a Divisional of application Ser. No. 07/892,995 filed Jun. 3, 1992, now abandoned.

BACKGROUND OF THE INVENTION

1. Field of the Invention

This invention relates to a rubber composition for an inner liner, and more particularly, to a rubber composition for an inner liner of a tubeless tire.

2. Description of Related Art

It is known that there are usually two types of tire structures for maintaining the inner pressure of an air-containing tire, that is, a structure composed of a tire and a tube not integrated with the tire, and a tubeless structure where a tire itself functions as a container for air.

Needless to say, the role of tube is to prevent escaping of air, so that not only airtightness at a joint of a tube and a valve, but also gas permeability of wall of the tube itself (inversely, airtightness) is an important factor.

The gas permeability is an inherent property of the polymer used. Practically speaking, there is not any polymer better than butyl rubber (isobutylene-isoprene rubber, IIR). Even at present, tubes are usually produced by using IIR as a main component.

"Inner liner" is a material adhered to the inside surface of a tire so as to maintain airtightness. In the early days, natural rubber and SBR were used as inner liners, but when they are used for a long period of time, air having permeated the liner is stored in carcass and thereby various problems occur concerning durability.

However, as it is known, it is difficult to adhere a good airtight butyl rubber to natural rubber and the like, and therefore, butyl rubber can not be easily used as an inner liner. In order to overcome the problem, a modified butyl rubber, that is, a halogenated butyl rubber has been used. This polymer has a gas permeability substantially similar to that of butyl rubber, and moreover, can be adhered to natural rubber and SBR. Therefore, the halogenated butyl rubber is one of the best materials as an inner liner for tubeless tires.

Since retention of the inner pressure is an important role for air-containing tires used as passenger car tires, track and bus tires and bicycle tires, a rubber composition comprising a halogenated butyl rubber as a main component is generally disposed at the inside of tire as an inner liner layer so as to keep the inner pressure.

As an example of a rubber composition for inner liner, Japanese Patent Application Laid-open No. Sho 57-172945 discloses a rubber composition for inner liner comprising 100 parts by weight of a rubber material prepared by blending 50-100 parts by weight of halogenated butyl rubber and 0-50 parts by weight of diene type rubber and 5-50 parts by weight of a resin homogenizing agent prepared by adding a small amount of ethylene-vinyl acetate copolymer, ethylene-methyl acrylate copolymer and/or ethylene-methacrylic acid copolymer to a petroleum resin.

Japanese Patent Application Laid-open No. Sho 57-195760 discloses a heat resistant rubber for an inner liner comprising 100 parts by weight of a rubber material composed of 10-80 parts by weight of a butyl rubber and 90-20 parts by weight of a diene rubber and 2-10 parts by weight of calcium oxide. This rubber aims at improvement in heat resistance.

Japanese Patent Application Laid-open No. Sho 62-62848 discloses a rubber composition for an inner liner having a specified storage dynamic modulus which comprises 100 parts by weight of a rubber composition composed of 60-100 parts by weight of halogenated butyl rubber and 0-40 parts by weight of diene rubber and a hydrocarbon oil type softening agent comprising 60% or more of a paraffin component and 5% or less of an aromatic component.

Japanese Patent Application Laid-open No. Sho 62-62849 discloses a rubber composition for inner liner comprising 100 parts by weight of a rubber composition composed of 60-100 parts by weight of a halogenated butyl rubber and 0-40 parts by weight of a diene rubber with which 0.5-10 parts by weight of a tert-butylphenol acetylene resin is compounded. This rubber composition for an inner liner exhibits a high stickiness to a tire case when not yet vulcanized, a high adhesion to a tire case when vulcanized, and good low temperature characteristics, and the formation of crack is suppressed.

As a rubber composition containing coumarone resin, Japanese Patent Application Laid-open No. Hei 1-215838 discloses a rubber composition for a tire tread which comprises 100 parts by weight of a diene rubber, 5-20 parts by weight of tung oil containing glycerides of eleostearic acid and oleic acid, 1-3 parts by weight of a triazine type accelerator and 1-30 parts by weight of a rosin type resin containing coumarone resin.

Japanese Patent Application Laid-open No. Sho 62-1735 discloses a tire tread rubber composition for race comprising 100 parts by weight of SBR containing 25-50 parts by weight of high styrene and 50 parts by weight of a coumarone-indene resin.

Halogenated butyl rubber can improve the inner pressure retaining property to a great extent as compared with other diene rubbers. However, the degree of shrinkage remarkably increases when non-vulcanized, and therefore, the processability is deteriorated, so that there is a problem in manufacturing.

For example, in the case of molding green tires (before vulcanizing), exfoliation is liable to occur at a part of an inner liner bonding portion forcibly self-adhered owing to the increased self-shrinking force. This is problematic in manufacturing.

In addition, after being formed into a liner by means of rolls or the like, the degree of shrinkage changes largely and therefore, there is a problem as to the accuracy of constitution parts. Further, it is difficult to form a halogenated butyl rubber into a thin film and therefore, the productivity is disturbed.

For improving the rubber compositions by making the shrinkage as small as possible, application of softners such as oils and the like has been tried, but this treatment disadvantageously lowers the inner pressure retaining property.

On the other hand, increase in the amount of a filler such as carbon black is effective to improve the anti-shrinking property and inner pressure retaining capacity, but disadvantageously lowers durability of tires, that is, early occurrence of cracks in tires upon running due to increase in modulus of elasticity of rubber and insufficient dispersion.

In view of such a situation as above, a straight chain hydrocarbon resin such as ESCOREZ 1102 is proposed as a compounding agent which does not relatively lower the running durability and can improve the anti-shrinking property and the improvement in anti-shrinkage is observed to some extent, but is not sufficient and the inner pressure retaining property is somewhat lowered though the degree of lowering is not so much as that caused by oils.

When conventional tackifiers such as phenolic resins, terpene resins and petroleum hydrocarbon resins are used, the results are similar to those as above.

In view of the foregoing, the present inventors have contemplated to solve the problems and completed the present invention.

SUMMARY OF THE INVENTION

It is an object of the present invention to provide a rubber composition for an inner liner exhibiting good anti-shrinkage and good inner pressure retaining property without deteriorating the running durability of a tire where the rubber composition is used as an inner liner.

According to the present invention, there is provided a rubber composition for an inner liner which comprises a coumarone resin and a member selected from the group consisting of natural rubber, synthetic rubber, a blend of natural rubber and synthetic rubber, and a blend of synthetic rubbers.

DESCRIPTION OF THE PREFERRED EMBODIMENTS

When resins such as ESCOREZ resins, phenolic resins, terpene resins, petroleum hydrocarbon resins and the like which have been heretofore used as an agent for enhancing anti-shrinkage of halogenated butyl rubber are compounded with a rubber composition composed of natural rubbers and/or synthetic rubbers, the resulting composition fails to exhibit a sufficient anti-shrinkage and inner pressure retaining property. However, according to the present invention, it has been found that when a coumarone resin is compounded with the rubber composition, the resulting composition has both a low shrinkage and a high inner pressure retaining property.

Examples of synthetic rubbers include polyisoprene rubber, butyl rubber, blends of polyisoprene rubber, butyl rubber, polybutadiene rubber, polystyrene butadiene rubber etc.

From the standpoint of retaining the inner pressure of a tire, it is preferable to apply the present invention to a rubber composition composed of 100-60 parts by weight of a halogenated butyl rubber and 0-40 parts by weight of a diene rubber.

More preferably the rubber composition is fully composed of a halogenated butyl rubber or contains 80 parts by weight or more of a halogenated butyl rubber.

This reason is as follows. Halogenated butyl rubbers have a higher inner pressure retaining property than other diene rubbers, but the anti-shrinking property is poorer, and therefore, when the compounding ratio of halogenated butyl rubbers is increased so as to enhance the inner pressure retaining effect, the degree of shrinkage also increases accordingly. However, the present, invention can suppress this drawback remarkably.

For compatibility of anti-shrinkage and anti-cracking property, it is preferable to compound carbon black of a nitrogen-adsorbing specific surface area of 80 $m^2/g$ or less.

Examplary suitable halogenated butyl rubbers include chlorinated butyl rubber, brominated butyl rubber, and derivatives thereof. Exemplary suitable diene rubbers include natural rubber, polyisoprene rubber, polybutadiene rubber, polystyrene-budadiene rubber and the like.

Coumarone resin may be called coumarone-indene resin, and is a general term for thermoplastic resins composed of mixed polymers of aromatic unsaturated compounds such as indene, coumarone, styrene and the like which are mainly contained in coal tar series solvent naphtha. Coumarone resins having a softening point of about 60°-120° C. are preferably used.

The amount of coumarone resin compounded with a rubber composition for an inner liner is usually 1-25 parts by weight, preferably 5-20 parts by weight per 100 parts by weight of a rubber composition composed of natural rubber or an ordinary synthetic rubber alone, or a blend of natural rubber with polyisoprene rubber, polybutadiene rubber and the like.

The amount of coumarone resin compounded with a rubber composition composed of 100-60 parts by weight of halogenated butyl rubbers and 0-40 parts by weight of diene rubbers is preferably 1-20 parts by weight, more preferably 5-16 parts by weight per 100 parts by weight of the above-mentioned rubber composition.

When the amount of coumarone resins is less than 1 part by weight, the anti-shrinking effect is not sufficient. When said amount exceeds 20 parts by weight, the resistance to breaking is lowered and stickiness at a nonvulcanized state becomes too high resulting in a trouble of causing adhesion.

The rubber composition for inner liner of the present invention may contain, if necessary, compounding agents usually used such as carbon black, softener, zinc oxide, sulfur and the like accordingly.

The rubber composition for an inner liner of a tubeless tire according to the present invention exhibits excellent anti-shrinkage, inner pressure retaining property and durability, in particular, anti-crack property upon actual running of the tire.

The rubber composition for an inner liner of the present invention is particularly effective when used for tires of which an important function is to retain the inner pressure such as passenger car tires, track and bus tires, bicycle tires and the like.

The rubber composition for an inner liner of the present invention exhibits a low rate of shrinkage, that is, a sufficient anti-shrinkage, even when not yet vulcanized, owing to the added coumarone resin.

After vulcanized, the rubber composition exhibits an excellent durability, in particular, the formation of cracks is prevented during the running of the tire, and further exhibits an excellent inner pressure retaining property.

According to the present invention, the anti-shrinkage and inner pressure retaining property can be improved without degrading the durability.

In addition, the present invention can solve problems in manufacturing tubeless tires and accuracy of parts for tire, and therefore, can enhance the productivity.

The present invention is illustrated by the following Examples which are not to be regarded as limiting the invention in any way.

EXAMPLES 1-4, COMPARISON EXAMPLES 1-4

According to the formulas (parts by weight) in Table 1, four kinds of rubber composition (Examples 1-4) of the present invention and 5 kinds of rubber composition (Comparison Examples 1, 2a, 2b, 3 and, 4) outside of the present invention were prepared.

In Examples 1-4, a prescribed amount of coumarone resin is incorporated. On the other hand, in Comparison Examples 1-4 a resin compound usually used is employed in place of a coumarone resin.

For the purpose of comparing similar compositions each other easily, the Examples and Comparison Examples are arranged in the following order:

Example 1—Comparison Example 1, Example 2—Comparison Example 2a—Comparison Example 2b, Example 3—Comparison Example 3 and Example 4—Comparison Example 4.

Evaluation methods used in Examples and Comparison Examples are as shown below.

(Shrinkage)

Each of the rubber compositions (200 g) is simply passed through a gap (0.7 mm) between rolls rotating at a speed of 20 cm/min. at 70° C., and wound up. This operation is repeated 8 times. The non-vulcanized rubber thus treated is marked with signs at a distance (L) of 30 cm in the direction parallel to the compression direction, sprinkled with a sufficient amount of a releasing agent, and placed on a flat stand. After 24 hours, the distance (A) between the signs is measured.

The rate of shrinkage of each of rubber compositions is calculated by the following formula (1):

$$[(L-A)/L] \times 100 \qquad (1)$$

The rate of shrinkage of Comparison Example 1 is divided by that of an Example or other Comparison Example and multiplied by 100. The product stands for the resistance to shrinkage, i.e. anti-shrinkage. When the product is larger than 100 (Comparison Example 1 being control), the anti-shrinkage is better than that of Comparison Example 1.

(Inner Pressure Retaining Property)

A vulcanized sheet of about 0.4 mm thick is prepared and measured by means of a gas permeation testing device (manufactured by Toyo Seiki K.K.) to determine an air permeation coefficient at 25° C.

The air permeation coefficient of Comparison Experiment 1 is divided by the air permeation coefficient of an Example or a Comparison Example.

The quotient is multiplied by 100. The product represents the Inner Pressure Retaining Property. That is, when the product is larger than 100 (Comparison Example 1 being control), the anti-air permeation, i.e. inner pressure retaining property, is better than that of Comparison Example 1.

(Anti-crack Property upon Actual Running)

A rubber composition in each of Examples and Comparison Examples is applied to a tire having a tire size of 175 SR 14 and an actual running test is carried out by taxi with a running distance of 60,000 km. Then it is observed whether cracks occur.

TABLE 1

| | Comparison Example 1 | Example 1 | Example 2 | Comparison Example 2a | Comparison Example 2b | Example 3 | Comparison Example 3 | Example 4 | Comparison Example 4 |
|---|---|---|---|---|---|---|---|---|---|
| Brominated butyl rubber | 100 | 100 | 100 | 100 | 100 | 60 | 60 | 60 | 60 |
| Natural rubber | | | | | | 40 | 40 | 30 | 30 |
| SBR | | | | | | | | 10 | 10 |
| Carbon Black N 660 | 70 | 70 | 70 | 70 | 80 | 70 | 70 | 70 | 70 |
| Softener | 7 | 7 | 7 | 7 | 7 | 7 | 7 | 7 | 7 |
| Coumarone resin | | 10 | 15 | | | 10 | | 5 | |
| Escorez 1102 B | 10 | | | 15 | 10 | | 10 | | 5 |
| Stearic acid | 1.5 | 1.5 | 1.5 | 1.5 | 1.5 | 1.5 | 1.5 | 1.5 | 1.5 |
| Dibenzothiazyl disulfide | 2 | 2 | 2 | 2 | 2 | 2 | 2 | 2 | 2 |
| Sulfur | 4 | 4 | 4 | 4 | 4 | 4 | 4 | 4 | 4 |
| Anti-shrinkage | 100 | 116 | 129 | 120 | 121 | 155 | 143 | 174 | 153 |
| Inner pressure retaining property | 100 | 114 | 125 | 88 | 115 | 51 | 32 | 62 | 46 |
| Anti-crack property upon actual running | No crack | No crack | No crack | No crack | Cracks occurred at 3 places | No crack | No crack | No crack | No crack |

What is claimed is:

1. A tire having an inner liner, wherein said inner line comprises:
   (A) a rubber composition consisting essentially of 60-100 parts by weight of a halogenated butyl rubber and 0-40 parts by weight of a diene rubber; and
   (B) 1-20 parts by weight of a coumarone resin per 100 parts by weight of said rubber composition.

2. The tire according to claim 1, wherein the amount of halogenated butyl rubber in said rubber composition is 80-100 parts by weight.

3. The tire according to claim 1, wherein the rubber composition further comprises carbon black having a nitrogen adsorptive specific surface area of 80 m²/g or less.

4. The tire according to claim 3, wherein the amount of halogenated butyl rubber in said rubber composition is 80-100 parts by weight.

* * * * *